US008980413B2

(12) United States Patent
Kang et al.

(10) Patent No.: US 8,980,413 B2
(45) Date of Patent: Mar. 17, 2015

(54) CELL PACKAGING MATERIAL AND METHOD FOR MANUFACTURING SAME

(75) Inventors: Han Jun Kang, Suwon-si (KR); Hee Sik Han, Siheung-si (KR); Woo Sic Jung, Ansan-si (KR); Sung Ho Lee, Ansan-si (KR); Jong Woon Yoon, Ansan-si (KR); Ji Hee Kim, Bucheon-si (KR); Sang Min Lee, Ansan-si (KR)

(73) Assignee: Youl Chon Chemical Co., Ltd., Seoul (KR)

( * ) Notice: Subject to any disclaimer, the term of this patent is extended or adjusted under 35 U.S.C. 154(b) by 481 days.

(21) Appl. No.: 13/496,927

(22) PCT Filed: Sep. 15, 2010

(86) PCT No.: PCT/KR2010/006294
§ 371 (c)(1), (2), (4) Date: Mar. 19, 2012

(87) PCT Pub. No.: WO2011/034337
PCT Pub. Date: Mar. 24, 2011

(65) Prior Publication Data

US 2012/0183706 A1 Jul. 19, 2012

(30) Foreign Application Priority Data

Sep. 18, 2009 (KR) ........................ 10-2009-0088505

(51) Int. Cl.
*B32B 3/00* (2006.01)
*B32B 5/16* (2006.01)
(Continued)

(52) U.S. Cl.
CPC ............... *H01M 2/344* (2013.01); *B32B 27/36* (2013.01); *B32B 7/12* (2013.01); *B32B 7/02* (2013.01); *B32B 27/30* (2013.01); *B32B 27/08* (2013.01);
(Continued)

(58) Field of Classification Search
CPC ............ B32B 7/02; B32B 7/12; B32B 27/08; B32B 27/10; B32B 27/30; B32B 27/36; B32B 27/38; B32B 27/40; B32B 5/16; C09D 11/322; C09D 11/326
USPC .......................... 428/206, 207, 213, 323, 336
See application file for complete search history.

(56) References Cited

U.S. PATENT DOCUMENTS 6,423,399 B1 * 7/2002 Endo et al. .................... 428/206
2006/0090868 A1 * 5/2006 Brownfield et al. ....... 162/181.6
(Continued)

FOREIGN PATENT DOCUMENTS

CN 1934602 A 3/2007
CN 101185180 A 5/2008
(Continued)

*Primary Examiner* — Betelhem Shewareged
(74) *Attorney, Agent, or Firm* — Sughrue Mion, PLLC

(57) ABSTRACT

Cell packaging according to one embodiment of the present invention comprises: a base film layer; and a print layer provided beneath or on the base film layer, and including a binder resin and carbon black. The base film layer or print layer of the cell packaging is partially removed by means of laser irradiation to expose the layer under same. Therefore, according to the cell packaging of the invention, a wide range of shapes or logos, etc. can easily be externally displayed so as to be discernible by means of laser irradiation. By thus imparting discernibility and externality to the cell packaging, a labeling process for attaching a separate label to the cell packaging can be excluded.

11 Claims, 1 Drawing Sheet

10
20
30
40
50

(51) Int. Cl.

| | |
|---|---|
| ***B32B 7/00*** | (2006.01) |
| ***H01M 2/34*** | (2006.01) |
| ***B32B 27/36*** | (2006.01) |
| ***B32B 7/12*** | (2006.01) |
| ***B32B 7/02*** | (2006.01) |
| ***B32B 27/30*** | (2006.01) |
| ***B32B 27/08*** | (2006.01) |
| ***B32B 27/40*** | (2006.01) |
| ***B32B 27/38*** | (2006.01) |
| ***H01M 2/02*** | (2006.01) |
| ***H01M 2/10*** | (2006.01) |
| *B41M 5/24* | (2006.01) |
| *B41M 5/34* | (2006.01) |

(52) U.S. Cl.

CPC ................. *B32B 27/40* (2013.01); *B32B 27/38* (2013.01); *Y10T 428/24901* (2015.01); *Y10T 428/24876* (2015.01); *B41M 5/24* (2013.01); *B65D 2203/02* (2013.01); *H01M 2/0275* (2013.01); *H01M 2/0287* (2013.01); *H01M 2/0295* (2013.01); *H01M 2/1094* (2013.01); *B41M 5/34* (2013.01)

USPC ........... 428/206; 428/207; 428/213; 428/323; 428/336

(56) References Cited

U.S. PATENT DOCUMENTS

| | | | | |
|---|---|---|---|---|
| 2008/0317979 | A1 | 12/2008 | Itakura et al. | |
| 2010/0189979 | A1 * | 7/2010 | Takeda et al. | 428/216 |
| 2012/0064319 | A1 | 3/2012 | Hata | |

FOREIGN PATENT DOCUMENTS

| | | | |
|---|---|---|---|
| CN | 101241975 | A | 8/2008 |
| EP | 0924095 | A1 | 6/1999 |
| JP | 11-152117 | A | 6/1999 |
| JP | H11181104 | A | 7/1999 |
| JP | 8-114893 | A | 4/2002 |
| JP | 2005120277 | A | 5/2005 |
| JP | 2006-305889 | A | 11/2006 |
| JP | 20084506 | A | 1/2008 |
| KR | 10-2002-0030737 | A | 4/2002 |
| KR | 10-2003-0029141 | A | 4/2003 |

* cited by examiner

CELL PACKAGING MATERIAL AND METHOD FOR MANUFACTURING SAME

CROSS REFERENCE TO RELATED APPLICATIONS

This application is a National Stage of International Application No. PCT/KR2010/006294 filed Sep. 15, 2010, claiming priority based on Korean Patent Application No. 10-2009-0088505 filed Sep. 18, 2009, the contents of all of which are incorporated herein by reference in their entirety.

TECHNICAL FIELD

The present invention relates to a cell packaging material for lithium secondary batteries or portable storage batteries, and a method for manufacturing the same. In particular, the present invention relates to a cell packaging material including a base film layer or printing layer removed partially by laser irradiation, and to a method for manufacturing the same.

BACKGROUND ART

In general, packaging materials obtained by pressing metal, particularly aluminum, and forming it into a cylindrical or parallelepiped shape have been used as cell packaging materials for lithium secondary batteries, portable storage batteries or the like. However, such metallic can packaging materials have a hard outer wall and thus have a limitation that the shape of a cell to be packaged is determined by the shape of metallic can packaging materials.

To overcome such a limitation, laminate cell packaging materials have been developed. For example, Korean Patent Application No. 2003-7002427 discloses a cell packaging material including a base layer, an adhesive layer, a barrier layer, a dry laminate layer and a sealant layer. Further, Korean Patent Application Laid-Open No. 2002-0030737 discloses a cell packaging material including a laminate structure of a base film and a surface protection layer using biaxially oriented nylon, polyethylene terephthalate (PET) or polyolefin resins.

However, such conventional cell packaging materials are finished through a separate labeling operation in which a label is attached to the cell packaging materials in order to impart distinguishability or exterior design after packaging cells. Such a separate labeling operation has the problems of delayed production and increased manufacture cost. In addition, since labels that have been used to date are those obtained by printing bar codes, etc., through a dot printing process, there have been limitations in marking various logos, shapes, or the like.

DISCLOSURE

Technical Problem

The present invention is directed to providing a cell packaging material and a method for manufacturing the cell packaging material, which may protect a cell safely and may be provided with distinguishability and exterior design easily by laser irradiation without any separate labeling operation, and may improve exterior design by realizing various colors.

The present invention is also directed to providing a cell packaging material and a method for manufacturing the cell packaging material, which may be obtained in a short manufacturing time, have a low weight, have no limitation in shape, and be provided with excellent heat resistance, electric insulation property, moisture-proof and gas barrier properties, stability, chemical resistance, heat sealing strength and moldability.

Technical Solution

In embodiments of the invention, provided is a cell packaging material, including: a base film layer; and a printing layer provided at the lower part or upper part of the base film layer and comprising a binder resin and carbon black, wherein the base film layer or the printing layer is removed partially by laser irradiation to expose the underlying layer.

In embodiments of the invention, provided is a method for manufacturing a cell packaging material, including: providing a printing layer comprising a binder resin and carbon black at the lower part or upper part of a base film layer; and subjecting the base film layer or the printing layer to laser irradiation to remove the base film layer or the printing layer partially so that the underlying layer of the base film layer or the printing layer is exposed.

According to an embodiment of the invention, the base film layer and the printing layer may have a different color from each other.

According to an embodiment of the invention, the laser may be a $CO_2$ laser.

According to an embodiment of the invention, the carbon black may have a particle diameter of 1-4 μm.

According to an embodiment of the invention, the printing layer may include, as a binder resin, an epoxy, vinyl, phenol, melamine, polyimide, polyester, polyurethane, polyethylene terephthalate or polyether urethane resin.

According to an embodiment of the invention, the binder resin may be contained in an amount of 5 wt % or more and less than 20 wt % based on the total composition forming the printing layer.

According to an embodiment of the invention, the base film layer may have a thickness of 5-30 μm.

According to an embodiment of the invention, the cell packaging material may further include a hard coating layer formed on the outermost layer of the base film layer or the printing layer and containing a urethane acrylate oligomer.

According to an embodiment of the invention, the cell packaging material may further include: a barrier layer formed at the lower part of the base film layer or the printing layer; a melt extrusion resin layer formed at the lower part of the barrier layer; and a sealant layer formed at the lower part of the melt extrusion resin layer.

Advantageous Effects

According to the cell packaging material disclosed herein, the base film layer or the printing layer is removed partially by laser irradiation so that the underlying layer is exposed, and thereby realizing distinguishability or exterior design. In this manner, it is possible to avoid a separate labeling operation through which the packaging material has been provided with distinguishability or exterior design, and to improve the productivity. In addition, it is possible to mark logos specific to customers, irregular shapes, serial numbers, quality marks or other diverse patterns on the outer surface of the cell packaging material. As a result, it is possible to provide a cell packaging material provided with not only cell protection function but also various additional functions.

Moreover, the cell packaging material may realize various colors to impart an improved exterior design. Particularly, it is possible to match the color of the cell packaging material with that of the cell or that of the electronic appliance in which the cell is used.

Furthermore, according to embodiments of the invention, it is possible to provide a cell packaging material which may be obtained in a short manufacturing time, have a low weight, have no limitation in shape, and be provided with excellent heat resistance, moisture-proof and gas barrier properties, stability, chemical resistance, heat sealing strength and moldability. The cell packaging material may be also provided with good printability so that the printing layer shows little color difference even after molding. In addition, the cell packaging material may be prevented from interlayer separation.

DESCRIPTION OF MAIN ELEMENTS IN THE DRAWINGS

10: Base film layer
20: Printing layer
30: Adhesive layer
40: Barrier layer
50: Sealant layer

MODE FOR INVENTION

Hereinafter, a cell packaging material for lithium secondary batteries or portable storage batteries and a method for manufacturing the same according to the embodiments of the invention will be described in detail.

Figure 1:
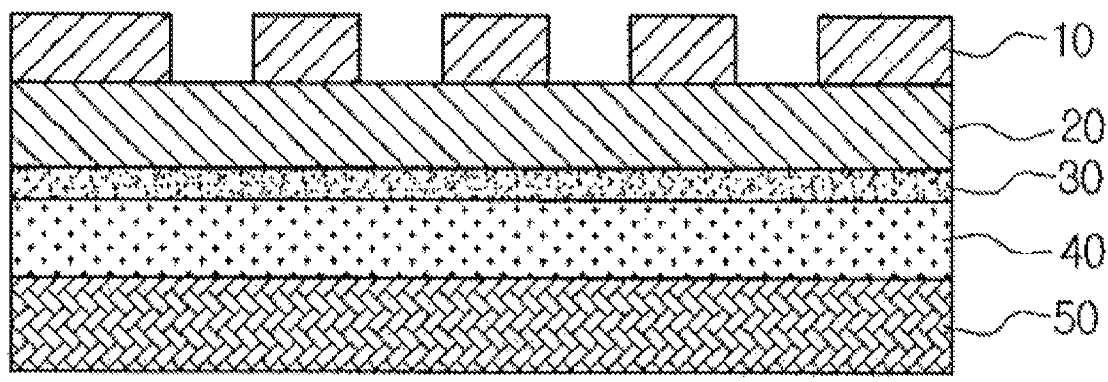
FIG. 1 is a schematic view showing the layered structure of the cell packaging material in accordance with an embodiment.
Figure 2:
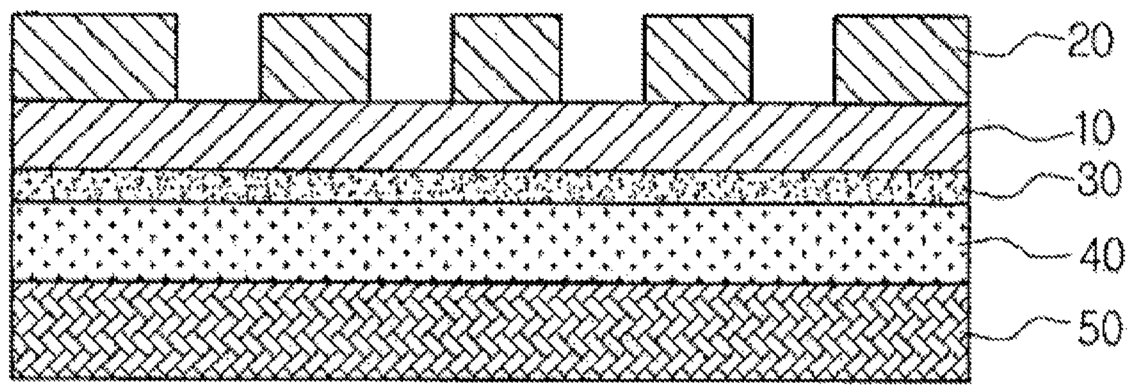
FIG. 2 is a schematic view showing the layered structure of the cell packaging material in accordance with another embodiment.

FIG. 1 and FIG. 2 are schematic views each showing the layered structure of the cell packaging material in accordance with embodiments of the invention.

In general, a cell includes a cathode, an anode, a separator, electrolyte, or the like, and the external part of the cell may be packed with a packaging material. This packaging material is referred to as a cell packaging material.

The cell packaging material in accordance with an embodiment of the invention includes a base film layer 10, a printing layer 20, an adhesive layer 30, a barrier layer 40 and a sealant layer 50, stacked successively (see FIG. 1). Herein, the position of the printing layer 20 and the base film layer 10 may be reversed (see FIG. 2). In addition, the printing layer may be an adhesive printing layer having an adhesive incorporated thereto.

According to embodiments, the base film layer 10 or the printing layer 20 is removed partially so that the underlying printing layer 20 or base film layer 10 is exposed. In this manner, it is possible to impart distinguishability or exterior design to the cell packaging material without any separate labeling operation.

The base film layer 10 or the printing layer 20 may be removed easily by laser irradiation. When the base film layer 10 or the printing layer 20 is subjected to laser irradiation, the portion irradiated with laser beams is burned and removed with ease. Particular examples of the laser include a gas laser, eximer laser, semiconductor laser, or the like, and a carbon dioxide ($CO_2$) laser may be preferably used in view of markability. Carbon dioxide lasers show lower reflection or scattering as compared to other types of lasers, and thus allow energy concentration to a target to which laser beams are irradiated. Shortening carbon dioxide laser pulses may minimize thermal damage upon the portions other than the target, thereby improving markability.

Particularly, a $CO_2$ laser with a wavelength of 1,604 nm may be used. Although there is no particular limitation in energy dose of laser irradiation, the magnitude of energy of laser irradiation may be determined considering possibility of breakage of the underlying layer and the particular type of the layer subjected to energy irradiation (base film layer or printing layer).

In the cell packaging material according to an embodiment of the invention, when the base film layer 10 is removed partially by laser irradiation, the printing layer 20 provided below the base film layer 10 is exposed partially. Thus, it is possible to express various shapes or letters through the exposed portion. To express shapes, etc. through the exposed portion, it is preferable that the base film layer 10 is different from the printing layer 20 in color. In addition, even when the base film layer 10 has the same color as the printing layer 20, they may be different from each other in brightness.

Hereinafter, each layer forming the cell packaging material will be described in detail.

The base film layer 10 may include a polyester film or polyamide film alone, or a laminate of polyester film and polyamide film (the stacking sequence may be varied).

The polyester film has excellent electrolyte resistance, and particular examples of the polyester film include at least one selected from the group consisting of polyethylene terephthalate (PET), polybutylene terephthalate (PBT), polyethylene naphthalate (PEN), polybutylene naphthalate (PBN), copolyester and polycarbonate (PC), etc.

The polyamide film serves to reinforce moldability, which is required particularly for a molding type packaging material. In case of a molding type packaging material, a moldable biaxially oriented polyamide film may be used considering the capacity and dimension of a cell. Particular examples of the biaxially oriented polyamide film resin include at least one selected from the group consisting of nylon 6, nylon 6.6, copolymers of nylon 6 with nylon 6.6, nylon 6.10, polymetaxylylene adipamide (MXD 6), etc.

According to embodiments of the invention, since laser irradiation causes heat generation, preferably heat resistant films may be used among the above-mentioned films. Particularly, it may be preferable that a PET film or biaxially oriented polyamide film having excellent heat resistance, dimensional stability and processability are used as the base film layer 10.

The base film layer 10 may have a thickness of 15-25 μm. When the base film layer 10 has a thickness less than 15 μm, gas barrier property may be degraded and aluminum foil may be oxidized and corroded. When the base film layer 10 has a thickness more than 25 μm, it may not be easy to form the edge portions of a cell packaging material during molding and the resultant cell packaging material may show poor flexibility.

Meanwhile, the polyester film and the polyamide film may be laminated with each other by using an adhesive. The adhesive used herein may be a polyurethane adhesive having excellent heat resistance. Particularly, a urethane-based two-part (two components) adhesive may be used. When a cell moves after it is packed in a packaging material, temperature may increase due to heat generation, and to this end an adhesive having low heat resistance may cause interlayer separation between the polyester film and the polyamide film. Therefore, it is required to use an adhesive having excellent heat resistance.

According to an embodiment of the invention, at least one selected from the group consisting of a flame retardant, a slip agent, a pigment and a conductive ink may be added to the base film layer 10 to provide a cell packaging material having various functions.

Any flame retardant generally known to those skilled in the art may be used without particular limitation. It is advantageous that flame retardants used herein have compatibility with the resin used in the base film layer 10 and cause no degradation of lamination quality of the layers. In addition, it is advantageous that the flame retardants do not affect mechanical properties of finished products, and cause a low degree of fuming and toxic gas generation upon combustion.

Non-limiting examples of the flame retardant include organic flame retardants, such as phosphorus-, halogen-, melamine-based flame retardants or the like, or inorganic flame retardants, such as aluminum hydroxide, antimony-based flame retardants, magnesium hydroxide or the like. Considering the environmental problems, it is advantageous that non-halogen flame retardants are used.

The slip agent functions to prevent adhesion between one film layer and another film layer and provides surface lubrication of films or sheets. Any slip agents may be used herein, and particular examples thereof include polymers imparting slip property, such as silicone, siloxane, silane, wax, etc. In addition, non-limiting examples of the slip agent include fatty acid amides, such as oleic acid amide, erucic acid amide, etc.

Particular examples of the pigment include general inorganic pigments or organic pigments having various colors. Particular examples of the inorganic pigments include white-colored zinc oxide (ZnO), titanium dioxide ($TiO_2$), basic lead carbonate, lithopone, a mixture of ZnS with $BaSO_4$, $2PbCO_3.Pb(OH)_2$, black-colored iron oxide ($FeO.FeO_3$), carbon black, yellow-colored lead chromate ($PbCrO_4$), yellow iron oxide ($FeO(OH)$ or $Fe_2O_3.H_2O$), cadmium yellow (CdS or a mixture of CdS with ZnS), titanium yellow ($TiO_2.NiO.Sb_2O_3$), orange-colored chrome orange ($PbCrO_4.PbO$), molybdenum orange ($PbCrO_4.PbMoO_4.PbSO_4$), red-colored red iron oxide, lead oxide red, cadmium red, violet-colored manganese violet, blue-colored Prussian blue ($Fe(NH_4)Fe(CN)_6.xH_2O$), ultramarine ($Na_{6-8}Al_6Si_6O_{24}S_{2-4}$), cobalt blue ($CoO.Al_2O_3$), green-colored chrome green (a mixture of lead chromate with Prussian blue), Emerald green ($Cu(CH_3CO_2)_2.3Cu(AsO_2)_2$), or the like.

Particular examples of the organic pigments include yellow-, orange- or red-colored azo type pigments, blue-, violet- or green-colored phthalocyanine pigments, or condensed multicyclic pigments such as anthraquinone, thioindigo, perione, perylene, quinacridone pigments, or the like.

Incorporation of a pigment into the base film layer 10 allows the cell packaging material to realize various colors. Meanwhile, the pigment contained in the base film layer 10 may be selected adequately from the above-mentioned pigments considering the color of the printing layer 20.

Any conductive ink generally known to those skilled in the art may be used. Incorporation of the conductive ink into the base film layer 10 provides the cell packaging material with electromagnetic wave shielding effect. The conductive ink is formed by adding conductive fillers to a binder resin. Particular examples of the conductive fillers include metals such as silver, gold, platinum, copper or nickel, metal oxides such as ruthenium oxide, amorphous carbon powder, graphite, carbon fibers, etc.

The printing layer 20 may include a binder resin and carbon black. Incorporation of carbon black into the printing layer 20 allows the printing layer to have a color contrasted with the color of the base film layer 10. As a result, the printing layer 20 or the base film layer 10 exposed through the portion of the base film layer 10 (see FIG. 1) or the printing layer (see FIG. 2) removed by laser irradiation may be seen clearly. Therefore, it is possible to improve the distinguishability of a shape or pattern exposed through the removed portion of the base film layer 10 or the printing layer 20.

Particular examples of the binder resin include curable resins having excellent heat resistance, acid resistance, solvent resistance, alkali resistance, scratch resistance, etc. Particular examples of such curable resins include epoxy, vinyl, phenol, urea, alkyd, melamine, polyimide, polyester, polyurethane, polyethylene terephthalate, polyether urethane resins, etc. Particularly, vinyl resins and polyurethane resins having excellent printing transferability and heat resistance may be used as the binder resin.

Since the printing layer 20 uses a curable resin as a binder resin, it not only shows excellent heat resistance, acid resistance, solvent resistance, alkali resistance, etc. but also has good printability so as to cause no color deviation even after molding.

The binder resin may be used in an amount of 5 wt % or more and less than 20 wt % based on the total weight of the composition forming the printing layer 20. When the binder resin is used in an amount of 20 wt % or more, the printing layer may have a low printing transferability. When the binder resin is used in an amount of less than 5 wt %, printing defects, such as wrinkling or formation of comb teeth may occur.

The carbon black may have a particle diameter of 1-4 μm to reduce or prevent degradation of printing transferability, printing defects caused by ink filling-up, or the like. The carbon black may be used in an amount of 5-15 wt %, particularly 10 wt % based on the total weight of the composition forming the printing layer 20.

The printing layer 20 may further include general inorganic pigments or organic pigments in addition to carbon black to realize various colors.

To form the printing layer 20, gravure, microgravure, reverse gravure, comma printing processes, etc. may be used. Particularly, gravure printing may be used. Meanwhile, to improve printing uniformity and to enhance laser marking efficiency during gravure printing, as well as to realize a color with high quality, a 100-200 line cylinder may be used as a cylinder used for printing.

In addition, fragrance-emitting microcapsules may be incorporated to the printing layer 20 so that the cell packaging material emits various fragrances. The printing layer having the fragrance-emitting microcapsules incorporated thereto may be obtained by mixing such microcapsules with the binder resin to disperse the microcapsules into the binder resin, further mixing the resultant mixture with a pigment to form a composition for forming the printing layer 20, and carrying out printing with the composition.

The fragrance-emitting microcapsules are obtained by dissolving oil-based fragrances, for example, derived from flowers or fruits, into an organic solvent. Particular examples of the capsulation material include natural polymers, such as gelatin, gum Arabic, casein, etc., or synthetic polymers such as ethyl cellulose, polyvinyl alcohol, polyethylene, etc.

Further, the printing layer 20 may further include a temperature indicator ink. The term 'temperature indicator ink' means ink undergoing a change in color depending on temperature. Such temperature indicator ink undergoes a change in color (or color loss) by absorbing energy, and recovers its original color or undergoes a change into another color upon the blocking of energy absorption. Various types of temperature indicator ink are known to those skilled in the art according to its color, color change temperature (color change temperature may be in a wide range of −30 to 120° C.), color change mechanism, etc.

When forming the printing layer 20 by using a temperature indicator ink, the thermal behavior of the cell may be determined through the cell packaging material. Thus, it is possible to ensure the stability and reliability of the cell. It is also possible to determine directly whether the cell packaging material is subjected to sealing at an adequate temperature or not.

The printing layer 20 and the barrier layer 40, or the base film layer 10 and the barrier layer 40 may be adhered by the adhesive layer 30 interposed therebetween.

The adhesive forming the adhesive layer 30 may be one having printability, adhesive stability (thermal stability), chemical resistance and oil resistance, so that the adhesive maintains its adhesion during laser irradiation. Particular examples of the adhesive may include one-part (one component) adhesives including acrylic, epoxy, phenolic, melamine, polyimide, polyester, polyurethane, polyethylene terephthalate, polyether urethane adhesives etc., or two-part (two components) adhesives including a base part and a curing agent part. Particularly, acrylic or urethane adhesives having excellent heat resistance may be used to inhibit a lifting phenomenon that may occur during laser irradiation. A low-viscosity adhesive or high-viscosity adhesive may be used as the acrylic adhesive.

In addition, adhesives containing a flame retardant may be used in order to improve flame resistance of the cell packaging material. However, when adding a flame retardant to the adhesive layer, excessive flame retardant may cause degradation of adhesive property, resulting in interlayer separation or whitening. Therefore, addition of a flame retardant to the adhesive layer may be carried out in an amount of greater than 0 wt % and equal to or less than 30 wt % based on the weight of the adhesive.

According to an embodiment, the adhesive may be incorporated to the printing layer to form an adhesive printing layer so that the printing operation may be simplified.

The barrier layer 40 is intended to shied moisture or gas and particular examples thereof include aluminum foil. Further, aluminum foil may contain iron. Such aluminum containing iron has excellent insulation property and reduces generation of pinholes caused by bending of a layered laminate. Particularly, when forming an embossed sheath, such aluminum containing iron may facilitate formation of side walls. Herein, when the iron content is less than 0.6 wt %, it may be difficult to prevent pinhole generation and to improve embossing moldability. On the other hand, when the iron content is more than 2.0 wt %, flexibility of aluminum may be degraded and processability may be lowered during the molding of a pouch with the laminate. In addition, aluminum foil may contain silicon. When the silicon content exceeds 0.9 wt %, the aluminum foil show poor processability during the molding into a pouch although it shows improved magnetic property. On the other hand, when the silicon content is less than 0.05 wt %, the resultant product has poor strength and elongation, resulting in degradation of processability during the molding into a pouch.

Therefore, the aluminum foil may include, in particular, 0.05-0.9 wt % of silicon and 0.6-2.0 wt % of iron in view of moldability and processability.

Meanwhile, the aluminum foil may be subjected to non-chromate treatment on either surface or both surfaces thereof in order to prevent corrosion and to improve adhesion strength. Such non-chromate treatment includes forming an acid-resistant coating film by using at least one compound selected from the group consisting of organic compounds, such as titanium-containing resins, zirconium, phosphates, etc., and inorganic/organic composites. Herein, the non-chromate treatment may be carried out on both surfaces of the aluminum foil to increase resistance against salt. In addition to the above treatment, the aluminum foil may be coated with polymer resins, such as acrylic resins, phenolic resins, epoxy resins, fluororesins, or the like.

Hereinafter, the innermost layer, i.e., the sealant layer 50 will be described. The sealant layer may be formed with a thickness of 5-120 μm. An adhesive resin layer and a melt extrusion resin layer may be further formed between the barrier layer 40 and the sealant layer 50. In particular, an adhesive resin layer (or a melt extrusion resin layer) may be formed between the barrier layer 40 and the sealant layer 50, and a polyolefin (modified polypropylene) film or an extruded sealant layer may be used as the sealant layer 50.

Hereinafter, formation of the adhesive resin layer, the melt extrusion resin layer and the sealant layer will be explained. The adhesive resin layer is formed by coating an adhesive resin adhered easily to metal (e.g. aluminum) on the barrier layer 40. In the case of a cell requiring heat resistance, a polypropylene resin is used generally for the sealant layer 50. However, such a polypropylene resin is not adhered directly to aluminum. Thus, to facilitate adhesion to aluminum, an adhesive resin adhered easily to aluminum is used for the coating. The adhesive resin may be obtained by dissolving at least one selected from the group consisting of modified polyethylene, modified polypropylene and modified acrylic resins into a solvent.

Then, the melt extrusion resin layer may be formed between the adhesive resin layer and the sealant layer. The melt extrusion resin layer serves to laminate an upper layer with a lower layer by providing adhesive force through the melt extrusion coating film. The melt extrusion resin layer may be formed by carrying out melt extrusion of a polypropylene resin or polyethylene resin and applying the polypropylene resin or polyethylene resin on the barrier layer, and then laminated with the sealant layer.

When carrying out the melt extrusion coating, an ozone generating system capable of ozone irradiation may be used to perform peroxidization of the surface of the melt extrusion coating resin, thereby improving adhesion, as well as to form an ozone coating film, thereby improving barrier property, sealability and adhesion between the adhesive resin layer and the melt extrusion resin layer.

When the resin extruded during the melt extrusion coating is irradiated with ozone, it is possible to improve adhesion to a higher degree. Any known ozone generating system may be used. For example, atmospheric air may be pressurized by using an air compressor and the air may be separated into nitrogen and oxygen in an oxygen generator, so that pure oxygen is used exclusively to produce highly concentrated ozone through a silent plasma discharge system using radio frequency and high voltage. Such ozonated air may be sprayed to a resin ejection port through an air nozzle to perform strong oxidation of the resin coating film, thereby improving film adhesion strength. The coating film thickness of the melt extrusion resin layer may be 10-80 μm, preferably 10-40 μm.

The sealant layer 50 uses a heat sealable resin layer to perform heat sealing of the packaging material. When the resin used herein is a molding-type resin, it may provide slidability on the mold surface in a molding system and heat sealing strength, and prevent cracking, whitening or pinhole generation of a heat sealing layer caused by molding conditions. For this purpose, the sealant layer may include plastic films formed by adding at least one selected from ethylene, butadiene and ethylene propylene rubber to at least one selected from polyethylene, polypropylene, ethylene copolymers, propylene copolymers, etc. In a variant, the sealant layer may be a modified polypropylene film.

According to an embodiment of the invention, the outmost layer of the base film layer 10 or the printing layer 20 may be further provided with an additional coating layer for the purpose of non-glare (matt) treatment, hologram treatment or glare (gloss) treatment. When the cell packaging material is further provided with a non-glare coating layer, it is possible to prevent light scattering, and thus to maximize marking efficiency upon laser irradiation, to minimize damages on the surface of the cell packaging material caused by light scattering, and to improve its handling. For example, the non-glare coating layer may be formed by coating a blend of an opaque pigment with a urethane acrylic resin onto the base film layer 10 via a gravure printing process.

According to an embodiment of the invention, the outermost layer of the base film layer 10 and the printing layer 20 may be further provided with a hard coating layer. The hard coating layer serves to prevent the base film layer 10 or the printing layer 20 from being scratched by external stress or from being swollen by a solvent. The hard coating layer may be formed by applying a UV curable hard coating agent to the printing layer, followed by UV curing. Particularly, a hard coating agent containing a low-functionality high-molecular weight resin may be used as the UV curable hard coating agent to improve the flexibility of the cell packaging material and to increase the solvent resistance, scratch resistance and hardness. The low-functionality high-molecular weight resin may include a urethane acrylate oligomer having two to three functionalities and a molecular weight of 10,000-30,000.

The hard coating agent may be applied by way of various printing processes, including gravure, microgravure, reverse gravure, comma printing processes, etc. The hard coating agent may be applied to a thickness of 4-12 μm in a dry state. When the thickness is less than 4 μm, the hard coating layer may have low surface hardness and poor UV curability. When the thickness is greater than 12 μm, the printing layer may show severe burrs upon laser irradiation, thereby providing poor markability. The hard coating layer may have a surface hardness of about 5H or higher.

The examples and experiments will now be described. The following examples are for illustrative purposes only and not intended to limit the scope of the present invention. As well, the following comparative examples are made just for the purposes of comparison with the examples.

EXPERIMENT 1

Evaluation of Characteristics of Cell Packaging Materials Depending on Particle Diameter of Carbon Black Example 1

A cell packaging material having a structure of printing layer/base film layer/adhesive layer/barrier layer (aluminum foil)/melt extrusion resin layer/sealant layer is provided.

The printing layer includes 10 wt % of a polyurethane resin and 10 wt % of carbon black having a particle diameter of 3 μm. The base film layer consists of a nylon resin and the adhesive layer consists of a polyester resin. The melt extrusion resin layer consists of a polypropylene resin. The sealant layer consists of a terpolymer of ethylene, propylene and butadiene.

Comparative Examples

Cell packaging materials are provided in the same manner as Example 1, except that carbon black having a particle diameter of 7 μm (Comp. Ex. 1) or 11 μm (Comp. Ex. 2) is used in the printing layer.

Printing Transferability

The cell packaging materials are cut into a size of 1 m×1 m to provide samples. Then, the number of non-printed portions in the printing layer of each sample is determined by the naked eyes. When any non-printed portion is not present, the sample is expressed as “o”. When two and three non-printed portions are present, the samples are expressed as “A” and “X”, respectively.

Ink Filling-Up

The printing layer of each sample cut into a size of 1 m×1 m is checked whether spots, such as cylinder spots, are generated or not. When a ratio of the spot generation area to printing layer area is 10% or less, the sample is expressed as “○”. When the ratio is 11% or more and less than 20%, the samples are expressed as “Δ”. When the ratio is 20% or more, the samples are expressed as “X”.

Markability

After the printing layer of each sample cut into a size of 1 m×1 m is subjected to laser irradiation, the spot generation area of the printing layer is measured. When a ratio of the spot generation area to printing layer area is 10% or less, the sample is expressed as “○”. When the ratio is 11% or more and less than 20%, the samples are expressed as “Δ”. When the ratio is 20% or more, the samples are expressed as “X”.

The following Table 1 shows the results of the experiment for determining the printing transferability, ink filling-up and markability depending on particle diameter of carbon black.

TABLE 1

| | Particle diameter of carbon black (μm) | Printing transferability | Ink filling-up | Markability |
|---|---|---|---|---|
| Ex. 1 | 3 | ○ | ○ | ○ |
| Comp. Ex. 1 | 7 | ○ | Δ | Δ |
| Comp. Ex. 2 | 11 | X | X | X |

EXPERIMENT 2

Evaluation of Characteristics of Cell Packaging Materials Depending on Binder Resin Content in Printing Layer Comparative Examples Cell packaging materials having a structure of printing layer/base film layer/adhesive layer/barrier layer (aluminum foil)/melt extrusion resin layer/sealant layer are provided.

The cell packaging materials are obtained in the same manner as Example 1, except that the printing layer contains a polyurethane resin in an amount of 3 wt % (Comp. Ex. 3) and 20 wt % (Comp. Ex. 4).

Printing Transferability

The cell packaging materials are cut into a size of 1 m×1 m to provide samples. Then, the number of non-printed portions in the printing layer of each sample is determined by the naked eyes. When any non-printed portion is not present, the sample is expressed as “○”. When two and three non-printed portions are present, the samples are expressed as “Δ” and “X”, respectively.

Workability

When the printing layer of a sample shows no coating line along the longitudinal direction during the period from the start of printing operation to the time of cell packaging work, the sample is expressed as “○”. When a sample shows one coating line along the longitudinal direction by the time of 2 hours after the start of printing operation, the sample is expressed as “Δ”. When a sample shows one coating line along the longitudinal direction by the time of 30 minutes after the start of printing operation, the sample is expressed as “X”.

The following Table 2 shows the results of the experiment for determining the printing transferability and workability depending on binder resin content contained in the printing layer.

TABLE 2

| | Binder resin content (wt %) | Printing transferability | Workability |
|---|---|---|---|
| Ex. 1 | 10 | ○ | ○ |
| Comp. Ex. 1 | 3 | X | ○ |
| Comp. Ex. 2 | 20 | X | X |

The invention claimed is:

1. A cell packaging material comprising:
a base film layer;
a printing layer provided at the lower or upper part of the base film layer;
a barrier layer provided at the lower part of the printing layer or the base film layer;
a melt extrusion resin layer provided at the lower part of the barrier layer; and
a sealant layer provided at the lower part of the melt extrusion resin layer,
wherein the printing layer comprises a binder resin and carbon black; and
wherein the base film layer or the printing layer is removed partially by laser irradiation to expose the underlying layer.

2. The cell packaging material according to claim 1, wherein the base film layer and the printing layer have a different color from each other.

3. The cell packaging material according to claim 1, wherein the carbon black has a particle diameter of 1-4 μm.

4. The cell packaging material according to claim 1, wherein the laser is a $CO_2$ laser.

5. The cell packaging material according to claim 1, wherein the printing layer comprises, as a binder resin, epoxy, vinyl, phenol, melamine, polyimide, polyester, polyurethane, polyethylene terephthalate or polyether urethane resin.

6. The cell packaging material according to claim 1, wherein the binder resin is contained in an amount of 5 wt % or more and less than 20 wt %.

7. The cell packaging material according to claim 1, wherein the printing layer further comprises at least one selected from the group consisting of pigment, slip agent, fragrance-emitting microcapsules and temperature indicator ink.

8. The cell packaging material according to claim 1, wherein the base film layer has a thickness of 5-30 μm.

9. The cell packaging material according to claim 1, wherein the base film layer further comprises at least one selected from the group consisting of pigment, flame retardant, slip agent and conductive ink.

10. The cell packaging material according to claim 1, wherein the outermost layer of the base film layer or the printing layer is subjected to non-glare treatment, hologram treatment or glare treatment.

11. A cell packaging material comprising:
a base film layer;
a printing layer provided at the lower or upper part of the base film layer and comprising a binder resin and carbon black; and
a hard coating layer provided at the outermost layer of the base film layer or the printing layer and containing a urethane acrylate oligomer,
wherein the base film layer or the printing layer is removed partially by laser irradiation to expose the underlying layer.

* * * * *